US010793196B2

(12) United States Patent
Marquez Duran et al.

(10) Patent No.: US 10,793,196 B2
(45) Date of Patent: Oct. 6, 2020

(54) STRUCTURAL BEAMS OF HARDENED UHSS WITH REINFORCEMENT AND METHOD FOR MANUFACTURING

(71) Applicant: AUTOTECH ENGINEERING S.L., Amorebieta-Etxano (ES)

(72) Inventors: Sergi Marquez Duran, Rajadell (ES); Xavier Canales Larios, Vilanova I la Geltru (ES); Jordi Castilla Moreno, Hospitalet de Llobregat (ES)

(73) Assignee: AUTOTECH ENGINEERING S.L., Amorebieta-Etxano (ES)

( * ) Notice: Subject to any disclaimer, the term of this patent is extended or adjusted under 35 U.S.C. 154(b) by 25 days.

(21) Appl. No.: 15/779,826

(22) PCT Filed: Dec. 16, 2016

(86) PCT No.: PCT/EP2016/081522
§ 371 (c)(1),
(2) Date: May 29, 2018

(87) PCT Pub. No.: WO2017/103169
PCT Pub. Date: Jun. 22, 2017

(65) Prior Publication Data
US 2018/0362093 A1    Dec. 20, 2018

(30) Foreign Application Priority Data

Dec. 18, 2015 (EP) ..................................... 15382645

(51) Int. Cl.
*B62D 25/04* (2006.01)
*B62D 29/00* (2006.01)
(Continued)

(52) U.S. Cl.
CPC .............. *B62D 25/04* (2013.01); *B60R 19/03* (2013.01); *B60R 19/18* (2013.01); *B62D 27/02* (2013.01);
(Continued)

(58) Field of Classification Search
CPC .......... B62D 25/04; B60R 19/18; B60R 19/03
(Continued)

(56) References Cited

U.S. PATENT DOCUMENTS

| 9,884,651 B2 * | 2/2018 | Irie ...................... B62D 21/157 |
| 2003/0155806 A1 * | 8/2003 | Goto ...................... B60R 19/18 293/120 |

(Continued)

FOREIGN PATENT DOCUMENTS

| EP | 2330016 A2 | 6/2011 |
| GB | 2497396 A | 6/2013 |

(Continued)

OTHER PUBLICATIONS

International Search Report for PCT/EP2016/081522, dated Mar. 2, 2017.
(Continued)

*Primary Examiner* — Dennis H Pedder
(74) *Attorney, Agent, or Firm* — Squire Patton Boggs (US) LLP

(57) ABSTRACT

A structural beam which comprises a first beam and a reinforcement to be attached to it. The first beam has a substantially U-shaped cross-section along at least a first portion of its length and comprises a bottom wall and two sidewalls wherein the bottom wall comprises a substantially flat first joining region. The reinforcement of the structural beam has a substantially flat second joining region which may be welded to a first joining region. Both parts of the
(Continued)

structure are made of hardened UHSS. Methods for manufacturing such beams are also provided.

15 Claims, 5 Drawing Sheets

(51) Int. Cl.
  *B60R 19/03* (2006.01)
  *B60R 19/18* (2006.01)
  *B62D 27/02* (2006.01)
(52) U.S. Cl.
  CPC .... *B62D 29/007* (2013.01); *B60R 2019/1813* (2013.01)
(58) Field of Classification Search
  USPC .................. 296/193.06, 29, 30; 293/102
  See application file for complete search history.

(56) References Cited

U.S. PATENT DOCUMENTS

2006/0028032 A1* 2/2006 Henseleit ............... B60R 19/18
  293/102
2011/0127802 A1* 6/2011 Kim ....................... B62D 25/04
  296/203.03

FOREIGN PATENT DOCUMENTS

JP       2009248585 A      10/2009
WO    WO 2015/107227 A2    7/2015

OTHER PUBLICATIONS

Extended European Search Report dated Jun. 14, 2016, for European Patent Application No. EP15382645, 6 pages.
International Search Report and Written Opinion for international Patent Application No. PCT/EP2016/081522 (P1511) dated Mar. 2, 2017, 10 pages.

* cited by examiner

STRUCTURAL BEAMS OF HARDENED UHSS WITH REINFORCEMENT AND METHOD FOR MANUFACTURING

The present application claims the benefit and priority to EP application 15 382 645.8 filed on Dec. 18, 2015. The present disclosure relates to structural beams, and in particular to structural beams incorporating a reinforcement structure. The present disclosure relates in particular to structural beams for vehicles, and more particularly to bumpers, B-pillars and A-pillars.

BACKGROUND

Vehicles such as cars incorporate a structural skeleton designed to withstand all loads that the vehicle may be subjected to during its lifetime. The structural skeleton is further designed to withstand and absorb impacts, in case of e.g. collisions with other cars.

The structural skeleton of a vehicle, e.g. a car, in this sense may include inter alia a bumper, pillars (A-pillar, B-pillar, C-pillar), side impact beams, a rocker panel, and shock absorbers. These components may incorporate a beam and additional plates around such a beam. Such beams may be manufactured in a variety of ways e.g. by hot stamping, and may be made of a variety of materials.

For the structural skeleton of a car, or at least for a number of its components, it has become commonplace in the automotive industry to use so-called Ultra-High Strength Steels (UHSS), which exhibit an optimized maximum strength per weight unit and advantageous formability properties. UHSS may have an ultimate tensile strength of at least 1000 MPa, preferably approximately 1500 MPa or up to 2000 MPa or more.

An example of steel used in the automotive industry is 22MnB5 steel. The composition of 22MnB5 is summarized below in weight percentages (rest is iron (Fe) and impurities):

| C | Si | Mn | P | S | Cr | Ti | B | N |
|---|---|---|---|---|---|---|---|---|
| 0.20-0.25 | 0.15-0.35 | 1.10-1.35 | <0.025 | <0.008 | 0.15-0.30 | 0.02-0.05 | 0.002-0.004 | <0.009 |

Several 22MnB5 steels are commercially available having a similar chemical composition. However, the exact amount of each of the components of a 22MnB5 steel may vary slightly from one manufacturer to another. In other examples the 22MnB5 may contain approximately 0.23% C, 0.22% Si, and 0.16% Cr. The material may further comprise Mn, Al, Ti, B, N, Ni in different proportions.

Usibor® 1500P, commercially available from Arcelor Mittal, is an example of a hardenable 22MnB5 steel used in various components, possibly involving so-called tailored and patchwork blanks but also reinforcements. Tailor (welded) blanks and patchwork blanks provide a blank with varying thickness prior to a deformation process e.g. hot stamping. The thickness variation in a tailored blank is not to be confused with (local) reinforcement. Reinforcements in this sense instead are added to a component after a deformation process.

Usibor® 1500P is supplied in ferritic-perlitic phase. It is a fine grain structure distributed in a homogenous pattern. The mechanical properties are related to this structure. After heating, a hot stamping process, and subsequent quenching, a martensite microstructure is created. As a result, maximum strength and yield strength increase noticeably.

The composition of Usibor® is summarized below in weight percentages (rest is iron (Fe) and unavoidable impurities):

| C | Si | Mn | P | S | Cr | Ti | B | N |
|---|---|---|---|---|---|---|---|---|
| 0.24 | 0.27 | 1.14 | 0.015 | 0.001 | 0.17 | 0.036 | 0.003 | 0.004 |

Various other steel compositions of UHSS may also be used in the automotive industry. Particularly, the steel compositions described in EP 2 735 620 A1 may be considered suitable. Specific reference may be had to table 1 and paragraphs 0016-0021 of EP 2 735 620, and to the considerations of paragraphs 0067-0079. In some examples the UHSS may contain approximately 0.22% C, 1.2% Si, and 2.2% Mn.

Steel of any of these compositions (both 22MnB5 steel such as e.g. Usibor® and the other compositions mentioned or referred to before) may be supplied with a coating in order to prevent corrosion and oxidation damage. This coating may be e.g. an aluminum-silicon (AlSi) coating or a coating mainly comprising zinc or a zinc alloy.

In a B-pillar, an important problem is to ensure that no deformation or little deformation occurs in the middle region, as intrusion may cause damage in the vehicle occupants. A B-pillar may be made of UHSS, e.g. Usibor®, and may have zones of different thickness. Particularly, a central region (around half the height of the B-pillar) may be stronger (i.e. thicker) to avoid the aforementioned intrusion. A B-pillar may further comprise a soft zone in the lower part of the B-pillar central beam, which possesses less stiffness than the central region. This is so as to concentrate energy dissipation far away from the central region, and to control the kinematics of deformation. Thus, the central region remains without deformation and the soft zone is deformed.

Another solution consists in welding reinforcements, e.g. by spot welding, to strengthen the structure. Such reinforcements are usually made of steel and even if the material is not as stiff as the material of the B-pillar central beam, e.g. Usibor®, the resulting structure is strengthened by the extra material. But the use of reinforcements involves a weight increment as extra material is added to the structure. And since the material of the reinforcement is not as strong or stiff as Usibor®, a thicker base material is needed, which adds to the weight increase.

Weight control requires serious attention, as automotive companies try to maximize weight reduction as a heavier vehicle involves not only higher manufacturing costs but also increased fuel consumption, greater difficulty when accelerating, braking and/or turning due to the high inertia of a large mass.

Another drawback of prior art arrangements is related to the way that a reinforcement is joined to the structure. It is known to join reinforcements to B-pillar central beams in different ways. A joining method consists of using adhesive bonding to paste the reinforcement, but the process can be complicated and it can take a long time.

It is also known to join the reinforcement by spot welding or seam welding, usually at least once at bottom wall but also in the sidewalls and/or flanges which can lead to fracture when twisting and/or bending.

As a rule, such a reinforcement must fit in the other part, otherwise welding may not be possible i.e. if both parts do not have contact between each other it will be almost impossible to weld them together, e.g. by spot welding.

Some steels used in reinforcements are malleable (even after hot stamping) and in case of an imperfect fitting they may be adapted to the part to be reinforced e.g. heating them. Since Usibor® is very rigid after hot stamping, it cannot be used in this sort of reinforcement. A perfect fitting would be needed as it is almost impossible to make it fit afterwards. This, in practice cannot be done. Moreover, heating Usibor® leads to a change in the microstructure and therefore, the reinforcement is softened.

In conclusion, there is a need for improving the mechanical behavior of structural skeleton of vehicles both when facing twisting forces and in crash events while at the same time reducing as much as possible the weight of the same skeleton.

SUMMARY

In a first aspect, a structural beam comprising a first beam and a reinforcement to be attached to it is provided. The first beam has a substantially U-shaped cross-section along at least a first portion of its length. This U-shape comprises a bottom wall and two sidewalls wherein the bottom wall comprises a substantially flat first joining region. The reinforcement has a second joining region wherein the second joining region is substantially flat. The first beam and the reinforcement are welded together at first and second joining regions. Both the first beam and the reinforcement are made of hardened UHSS.

In some examples, the reinforcement may be welded to the first beam only at the bottom wall of the U-shaped cross-section. In further examples, the reinforcement may be welded to different portions of the first beam.

The use of a first joining region in the bottom wall allows welding at bottom wall instead of welding at sidewalls and/or flanges of the structural beam first beam. Therefore the need of a perfect fitting is eradicated and so hardened UHSS may be used.

In some examples, the reinforcement may have a substantially U-shaped cross-section at least along a first part of its length, the U-shape including a bottom wall and two sidewalls.

According to an example, the cross-section of the reinforcement may comprise a groove in the bottom wall, and has a second joining region on both sides of the groove. The use of a groove increases the moment of inertia which improves the mechanical behavior of the structural beam when twisting and/or bending.

In some examples, the cross-section of the first beam may comprise a groove in the bottom wall, and may have a first joining region on both sides of the groove.

In some examples, the first beam may comprise a hole in the bottom wall.

In some examples, the reinforcement is laser welded to the first beam, optionally by remote laser welding. As compared to other welding techniques the welding region required is substantially smaller i.e. about 2 mm or more. In laser welding, the heat affected zone is smaller than in e.g. spot welding.

Another aspect of laser welding is the ability to weld at difficult access regions as just one instrument is used when welding, in contrast to e.g. the two electrodes of spot welding.

Preferably, joining (via welding) is only done at the bottom of the U-shape of the first beam.

In some examples, the hardened UHSS may be 22MnB5.

In some examples the structural beam may be part of a B-pillar.

In some examples the structural beam may be part of an A-pillar.

In some examples the structural beam may be part of a bumper.

In a second aspect, a method for manufacturing a structural beam for vehicles is disclosed. Firstly a first beam and a reinforcement according to any of the examples disclosed herein are provided. Then, the first beam and the reinforcement are welded at the first and second joining regions.

In some examples, welding may comprise laser welding, optionally remote laser welding.

In some examples, the reinforcement may be provided with a substantially U-shaped cross-section at least along a first part of its length, the U-shape including a bottom wall and two sidewalls.

In some examples, the first beam and/or the reinforcement may be formed by hot stamping.

BRIEF DESCRIPTION OF THE DRAWINGS

Non-limiting examples of the present disclosure will be described in the following, with reference to the appended drawings, in which.

DETAILED DESCRIPTION

Figure 1:
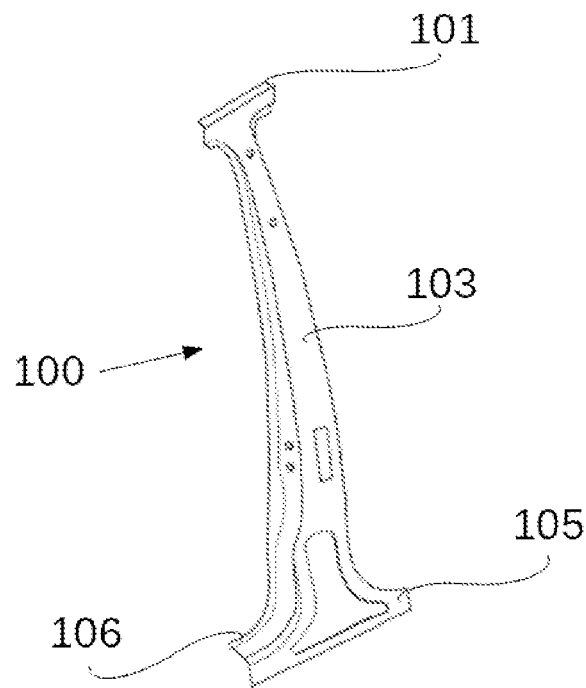
FIG. 1 illustrates a common B-pillar central beam.

FIG. 1 depicts a B-pillar central beam 100 which is, as a rule, welded to the rocker at the lower part 105, and to the roof panel of a vehicle, e.g. a car, in the upper part 101. It is situated between the front and rear seats of the vehicle and it is useful for different purposes. As said before, it gives structural support to the skeleton of the vehicle and provides a security barrier in a vehicle crash.

A B-pillar in some examples may comprise a first beam (or central beam), a reinforcement, an external plate and an internal plate. The internal plate may serve for attaching parts to the interior of the vehicle, e.g. a car. The external plate may serve particularly for providing a complementary shape to a car door. Both an interior plate and an external plate, depending on the specific implementation, may contribute to the structural strength and stiffness of the resulting B-pillar.

Besides, a B-pillar central beam is also used as mooring for many elements which are anchored in holes provided for each purpose. The B-pillar central beam 100 of FIG. 1 may have a hole to mount the anchor of the seatbelt, and another hole where a door lock may be placed. A B-pillar central beam may further comprise fastening holes of different shapes and sizes e.g. to attach plastic furnishings or linings of the internal vehicle structures. FIG. 1 further depicts flanges 106 that project outwardly.

The central region 103 of the B-pillar central beam is the most critical part in a vehicle lateral crash. The impact may cause an intrusion in the structure which may cause damage in vehicle occupants. It is therefore important to ensure that no deformation occurs in such central region 103 and consequently the zone is reinforced or stiffened.

Figure 2:
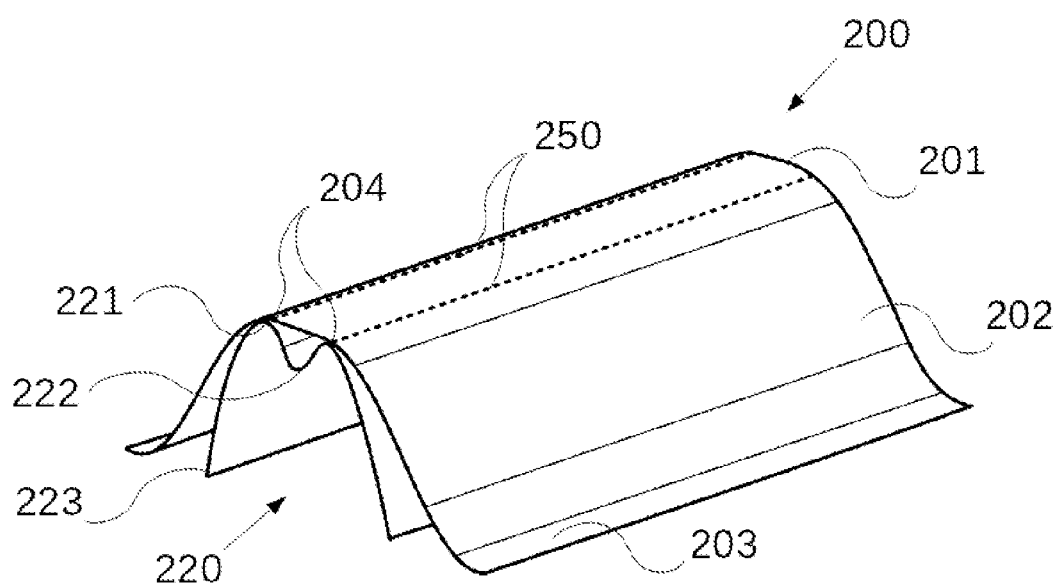
FIG. 2 illustrates a structural beam welded in an example.

FIG. 2 schematically depicts an example of a section of a B-pillar central beam 200 and a reinforcement 220 which is welded to the B-pillar central beam 200. The B-pillar central beam 200 may have a cross-section with an overall U-shape to face bending forces at least along a portion of its length. The U-shape comprises a bottom wall 201 with two first joining regions 204, two sidewalls 202 and flanges 203 that project outwardly. The reinforcement 220 may have two sidewalls 223, a groove 222 and two substantially flat joining regions 221 at both sides of the groove 222.

The B-pillar central beam 200 and the reinforcement 220 may be welded at both first joining regions 204 and second joining regions 221 in the outer face of B-pillar central beam bottom wall 201. In the figure continuous welds 250 are shown. The fact of being able to weld in bottom walls makes welding in e.g. flanges or sidewalls unnecessary. Therefore, the structure is not only configured to better face twisting forces compared to those structures with welds in e.g. sidewalls, but also to allow the use of hardened UHSS.

In other examples, the reinforcement may be welded to further or different portions of the first beam.

Joining the first beam and the reinforcement in examples according to the present disclosure may be based on laser welding instead of e.g. riveting. Laser welding techniques are used to join metal pieces together by melting and crystalizing the metal. Additionally, laser welding techniques may use a protector gas to avoid the creation of oxygen bubbles in the junction. The minimum flat surface required for laser welding is considerably less i.e. over a width of about 2 mm perpendicular to welding direction, compared to e.g. spot welding, which requires a minimum width of 15 mm.

Laser welding can be easily automatized i.e. involving an increase in speed and precision, and it generally does not need the addition of extra (filler) material because the melted metal is the base for the junction. It also allows continuous welding without creation of pores in the weld.

On the other hand, laser welding also allows the creation of discontinuous welds. A discontinuous weld line can be formed of a plurality of shorter weld lines. Such shorter weld lines may have a minimum length of 10 mm, preferably a minimum length of 30 mm.

In examples of the present disclosure, a reinforcement and a first beam of the structural beam may be welded by remote laser welding. The remote laser welding process is characterized by a long focal length (up to 1600 mm), a high-power and laser source, and beam deflection by the scanner. Compared to conventional laser welding, remote welding technology offers an increased flexibility (as greater number of process parameters may be taken into account), higher working speed, reduced number of clamping and reduced cycle time.

Remote laser welding is normally based on using a scanner to deflect and position the laser beam onto the surface of the work piece travelling at high speed. At present, 3D scanners are the most widely adopted scanners in remote welding applications, although 2D scanners may be also used. The scanner unit may be a galvanometer system, in which mobile mirrors are used and rotated by motors for guiding the laser beam. The scanner unit may be guided onto the surface of the work piece in conjunction with a robot.

Optionally, the movements of the scanner unit and the robot may be synchronized in real time for reducing non-productive repositioning time from one weld seam to the following weld seam. This configuration is commonly known as "welding on the fly". In "welding on the fly" configurations, the robot has a large working area, while the scanner unit provides high-speed and precise movements.

FIGS. 3a-3d show different cross-section examples of a structural beam first beam 311, 321, 331, 341 and reinforcement 312, 322, 332, 342 according to other examples of the present disclosure.

Figure 3A:
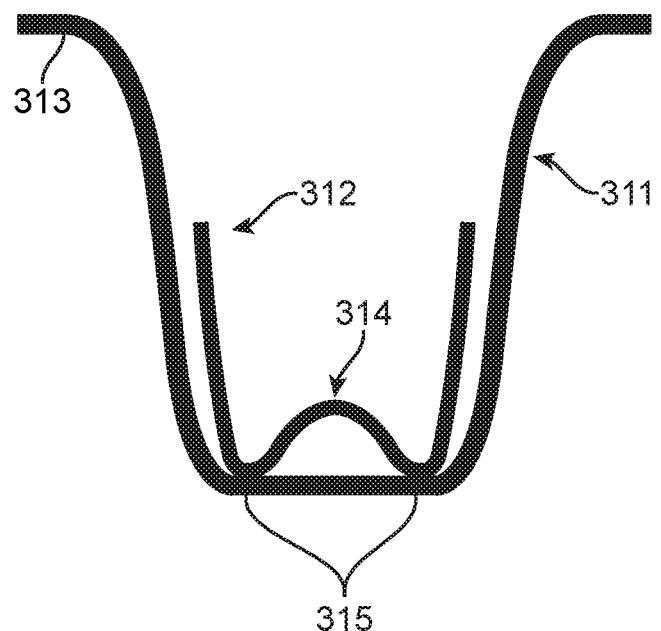
FIGS. 3a-3d illustrate examples of different shapes for the first beam and reinforcement of the structure according to examples.

FIG. 3a shows an example of a U-shaped cross-section of the first beam 311, in this example a B-pillar central beam, which has horizontal flanges 313. The example also shows a reinforcement 312 which cross-section comprises a groove 314 in its bottom wall and two joining regions 315 at both sides of the groove 314. The groove 314 increases the moment of inertia which improves the mechanical behavior when twisting and/or bending comparing with other reinforcements which comprise a flat bottom wall.

Figure 3B:
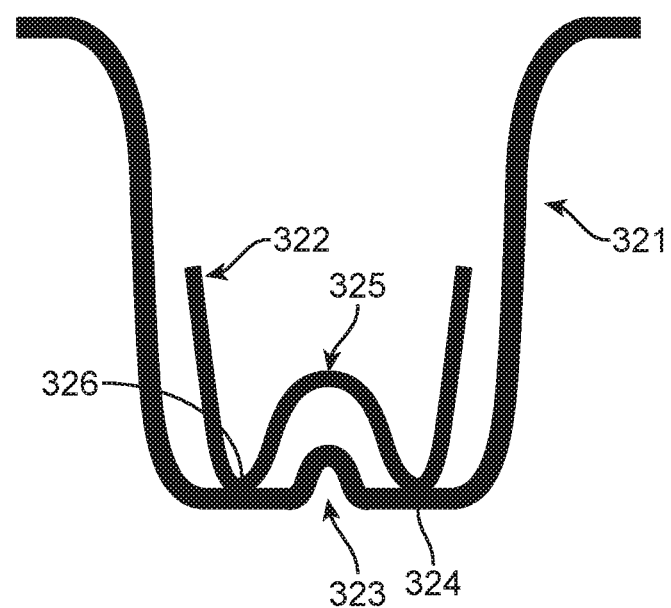

FIG. 3b shows an example wherein the cross section of the first beam 321, in this example a B-pillar central beam, comprises a groove 323 and two substantially flat joining regions 324 at both sides of the groove 323. Such groove 323 increases the moment of inertia which improves the mechanical behavior when twisting and/or bending but also restricts the expansion of a possible fracture to the rest of the structure. The figure also depicts a reinforcement 322 which cross-section has a groove 325 in the center of its bottom wall and two substantially flat joining regions 326 at both sides of the groove 325.

Figure 3C:
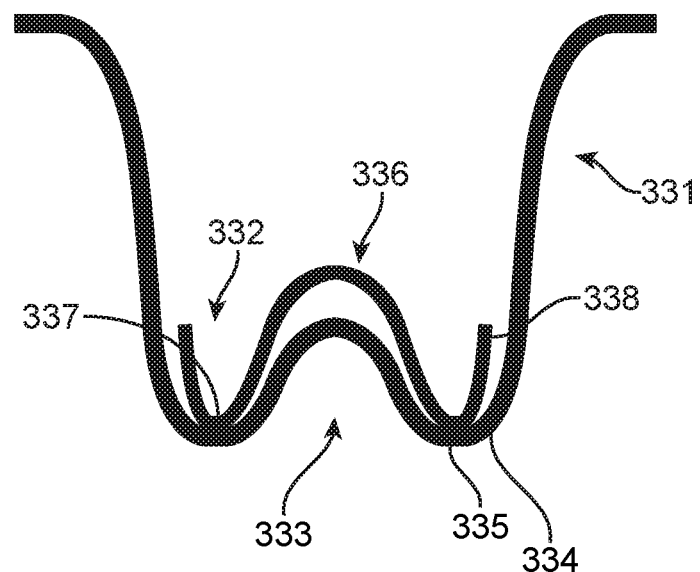

In FIG. 3c, a cross-section of the first beam 331, in this example a B-pillar central beam, which comprises a groove 333, which is substantially deeper than the groove depicted in FIG. 3b, and two substantially rounded joining regions 334, are shown. Each of the joining regions comprises a flat region 335, e.g. about 2 mm or more, to enable the welding. In the same figure, a cross-section is also shown of a reinforcement 332 with a groove 336 in the center of its bottom wall, which is substantially higher than the side walls 338, and two joining regions 337 at both sides of the groove 336.

Figure 3D:
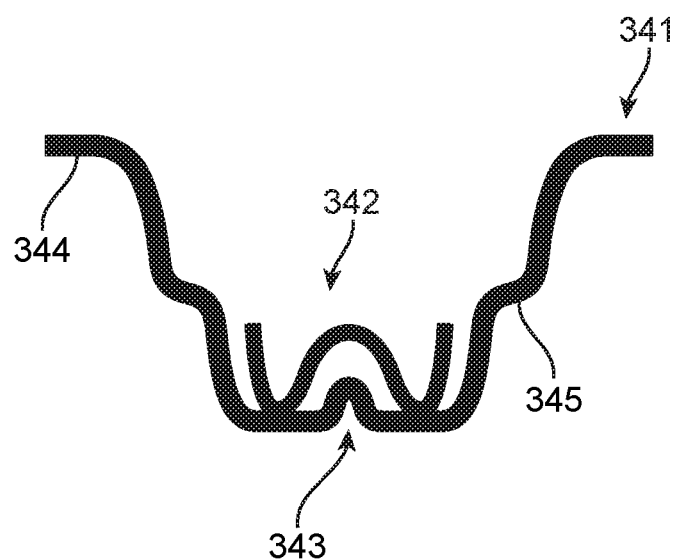

In FIG. 3d a further example is shown wherein the first beam 341, in this example part of a B-pillar central beam, comprises a groove 343 in its bottom wall, flanges 344 that project outwardly and a transition zone 345 in each sidewall. Such transition zones 345 may reduce the buckling. The figure also depicts a reinforcement 342 welded to the first beam 341.

In all these examples, remote laser welding may be used for joining the reinforcement to the B-pillar central beam. Since the joint to be formed is an overlap joint, preferably the width of the weld (and thus the joining regions) may be 6-8 mm or more.

The structural beams of FIGS. 3a-3d may also be suitable for a bumper, in such examples the structural beam first beam may also be referred as bumper beam.

Figure 4:
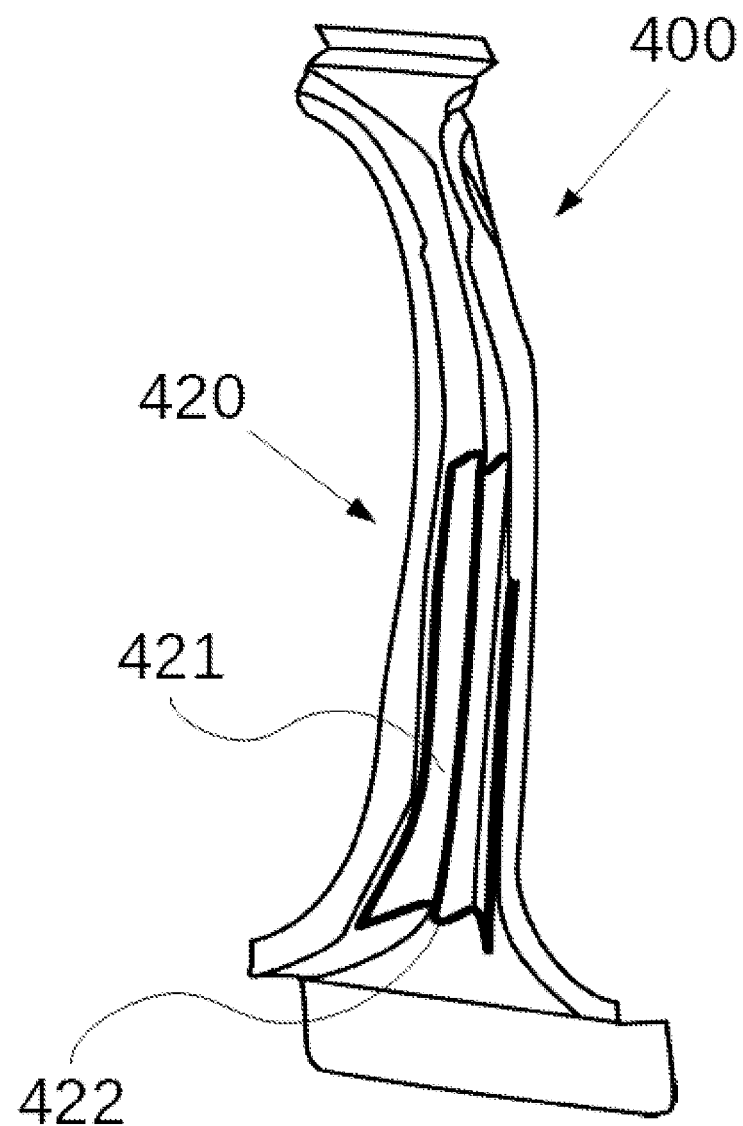
FIG. 4 illustrates a rear view of an example of a B-pillar central beam with a reinforcement.

FIG. 4 depicts a rear view of a B-pillar central beam according to an example. The B-pillar central beam 400 has a reinforcement 420 welded as shown in FIG. 2. The reinforcement 420 has a groove 422 and two sidewalls 421. The reinforcement 420 extends along nearly the entire length of the B-pillar central beam central region.

Figure 5:
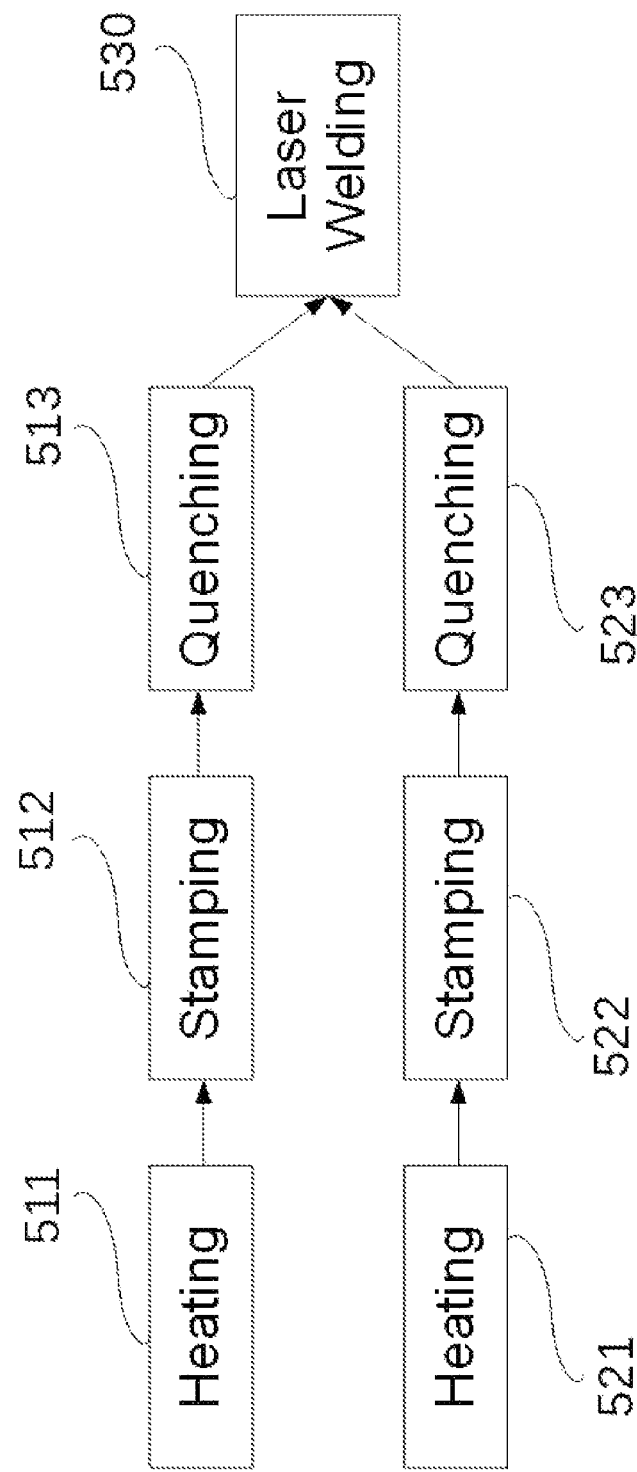
FIG. 5 schematically illustrates an example of a possible method for manufacturing a structural beam.

The first beam and the reinforcement of the structural beam may be manufactured separately by e.g. hot or cold stamping. FIG. 5 schematically depicts a method according to an example of the present disclosure. The method comprises two parallel processes in which structural beam first beam and a reinforcement are manufactured by hot stamping and then, the first beam and the reinforcement are welded together.

The first step of the method for manufacturing a structural beam first beam by a hot stamping process consists on heating 511 a steel blank in a furnace, e.g. to a temperature between 900° C. and 950° C. Then, the blank is stamped 512 (while it is still hot) to obtain the desired shape. Finally, the blank is quenched 513. After being quenched, the hardened steel is so rigid that it cannot be deformed. The reinforcement may be manufactured by the same hot stamping process. A steel blank may be heated 521 in a furnace, it may be stamped 522 while it is still hot and finally quenched 523. When both parts have been manufactured, they may be welded 530 together e.g. by laser welding, preferably by remote laser welding.

On the other hand, the first beam and the reinforcement may also be manufactured by cold stamping processes. In a cold stamping process (not shown), a steel foil is stamped without being warmed. After stamping, the foil is hardened by austempering, a process in which the foil is heated to austenization temperature e.g. 730° C. or above, and then quickly quenched.

Although only a number of examples have been disclosed herein, other alternatives, modifications, uses and/or equivalents thereof are possible. Furthermore, all possible combinations of the described examples are also covered. Thus, the scope of the present disclosure should not be limited by particular examples, but should be determined only by a fair reading of the claims that follow.

The invention claimed is:

1. A structural beam comprising:
a first beam and a reinforcement attached to the first beam, the first beam having
a substantially U-shaped cross-section along at least a first part of its length, the U-shape including at least a bottom wall, and two sidewalls, wherein
the bottom wall is a linear wall, with no bends, extending into the sidewalls at opposing ends of the linear wall,
the bottom wall having a first joining region,
the reinforcement having a second joining region, the second joining region including a flat area, and
the first beam and the reinforcement being welded together at the first and second joining regions, wherein, the reinforcement is welded to the first beam at the bottom wall of the U-shape cross-section, and wherein,
the first beam and the reinforcement are made of hardened UHSS, and
the second joining region comprises a arcuated region in cross section which has the flat area, such that the first beam and the reinforcement are welded at the flat area of the second joining region.

2. The structural beam according to claim 1, wherein the reinforcement has a substantially U-shaped cross-section at least along a first part of its length, the U-shape including a bottom wall and two sidewalls.

3. The structural beam according to claim 2, wherein the cross-section of the reinforcement comprises a groove in the bottom wall, and has the second joining region on both sides of the groove.

4. The structural beam according to claim 1, wherein the first beam comprises a hole in the bottom wall.

5. The structural beam according to claim 1, wherein the reinforcement is laser welded to the first beam.

6. The structural beam according to claim 1, wherein the hardened UHSS is 22MnB5.

7. A B-pillar comprising a structural beam according to claim 1.

8. A method for manufacturing a structural beam for vehicles,
the method comprising:
providing a first beam and a reinforcement configured to be attached to the first beam,
wherein the first beam has a substantially U-shaped cross-section along at least a first part of its length,
the U-shape comprising a bottom wall and two sidewalls,
the bottom wall being a linear wall, with no bends, extending into the sidewalls at opposing ends of the linear wall,
the bottom wall having a first joining region,
and the reinforcement having a bottom wall has a second joining region, the second joining region including a flat area,
welding the first beam and the reinforcement, wherein the reinforcement is welded to the first beam at the bottom wall of the U-shaped cross-section and between the first and second joining regions, and wherein,
the first beam and the reinforcement being made of hardened UHSS, and
the second joining region comprises a arcuated region in cross section which has the flat area, such that the first beam and the reinforcement are welded at the flat area of the second joining region.

9. The method according to claim 8, wherein the welding comprises laser welding.

10. The method according to claim 9, wherein the laser welding is remote laser welding.

11. The method according to claim 8, wherein the reinforcement is provided with a substantially U-shaped cross-section at least along a first part of its length, the U-shape including the bottom wall and two sidewalls.

12. The method according to claim 8, wherein one or both of the first beam and the reinforcement is formed by hot stamping.

13. A structural beam comprising:
a first beam and a reinforcement attached to the first beam, the first beam having
a substantially U-shaped cross-section along at least a first part of its length, the U-shape including at least a bottom wall, and two sidewalls, wherein
bottom wall has a first joining region, the first joining region including a flat area,
the reinforcement having a second joining region, the second joining region including a flat area, and
the first beam and the reinforcement being welded together at the first and second joining regions, wherein, the reinforcement is welded to the first beam at the bottom wall of the U-shape cross-section, and wherein
the first beam and the reinforcement are made of hardened UHSS,
the first joining region comprises a rounded region in cross-section which has the flat area and the second joining region comprises a rounded region in cross section which has the flat area, such that the first beam and the reinforcement are welded at the flat area of the first joining region and the flat area of the second joining region, the reinforcement has a substantially U-shaped cross-section at least along a first part of its length, the U-shape including a bottom wall and two sidewalls, the cross-section of the reinforcement comprises a groove in the bottom wall, and has the second joining region on both sides of the groove, and a depth of the groove as measured from a peak of the groove to the second joining region in an orthogonal direction to the second joining region of the reinforcement is greater than a length of the sidewall of the reinforcement measured from an end of the sidewall to the second joining region.

14. The structural beam according to claim 13, wherein the cross-section of the first beam comprises a groove in the bottom wall, and has the first joining region on both sides of the groove.

15. A method for manufacturing a structural beam for vehicles, the method comprising:

providing a first beam and a reinforcement configured to be attached to the first beam, wherein the first beam has a substantially U-shaped cross-section along at least a first part of its length, the U-shape comprising a bottom wall and two sidewalls, the bottom wall having a first joining region, the first joining region including a flat area, and the reinforcement having a bottom wall has a second joining region, the second joining region including a flat area, welding the first beam and the reinforcement, wherein the reinforcement is welded to the first beam at the bottom wall of the U-shaped cross-section and between the first and second joining regions, and wherein the first beam and the reinforcement being made of hardened UHSS, the first joining region comprises a rounded region in cross-section which has the flat area and the second joining region comprises a rounded region in cross section which has the flat area, such that the first beam and the reinforcement are welded at the flat area of the first joining region and the flat area of the second joining region, and the reinforcement has a substantially U-shaped cross section along at least a first part of its length, the U-shape including the bottom wall, two sidewalls, and a groove in the bottom wall, wherein a depth of the groove as measured from a peak of the groove to the second joining region in an orthogonal direction to the second joining region of the reinforcement is greater than a length of the sidewall of the reinforcement measured from an end of the sidewall to the second joining region.

* * * * *